Patented May 11, 1954

2,678,283

UNITED STATES PATENT OFFICE 2,678,283

CELLULOSE ESTERS PLASTICIZED WITH CAMPHORIC ANHYDRIDE

Torsten Hasselstrom, Philadelphia, Pa.

No Drawing. Application September 15, 1950, Serial No. 185,138

6 Claims. (Cl. 106—174)

(Granted under Title 35, U. S. Code (1952), sec. 266)

The invention described herein may be manufactured and used by or for the Government for governmental purposes, without the payment to me of any royalty thereon.

This invention relates to cellulose esters plasticized with camphoric anhydride.

I have found that camphoric anhydride, a compound having the structural formula

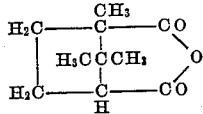

is a compatible plasticizer for cellulose esters, e. g. cellulose acetate.

This plasticizing effect is attained even at fairly low ratios of plasticized substance, e. g. at a ratio of about 5–15 parts by weight of plasticizer to 100 parts by weight of plasticized polymer. Good plasticizing effects are also attained at higher rates, such as about 25 parts of plasticizer to 100 parts of plasticized polymer; however, I have found that the plasticizing effect is not increased at such higher rates and that the films are generally less clear than if the ratio is 15 parts or less. My preferred range is thus 5–10 parts by weight of camphoric anhydride per 100 parts by weight of cellulose ester.

By way of example three runs of cellulose triacetate films were plasticized with camphoric anhydride in the respective ratio of 1:20, 1:10, and 3:20 (the numerator in each of the foregoing fractions being the proportionate weight of camphoric anhydride and the denominator being the weight of cellulose triacetate film). Each plasticized film was clear and flexible and shrank less than 7%.

Per cent shrinkage was computed by dissolving the cellulose triacetate in an inert organic solvent, adding the camphoric anhydride, pouring the plasticized substance into a Petri dish, and permitting the solvent to evaporate over a period of approximately three days. The ratio of the uncovered area of the Petri dish to its total area corresponds to the per cent shrinkage.

The preparation of camphoric anhydride is well known to the art; among methods for its preparation are the reaction of cis-camphoric acid with acetyl chloride, and the heating of trans-camphoric acid (Simonsen, The Terpenes, vol. 2, 1949, page 480). Another method of obtaining camphoric anhydride, specifically d-camphoric anhydride is the heat decomposition of higher diesters of d-camphoric acid, e. g. by heating the dihexyl ester of d-camphoric acid for about 40 h. at 230–270° C.; higher esters of camphoric acid and their preparation are disclosed in my copending patent application Serial No. 185,139, filed September 15, 1950.

Camphoric anhydride is particularly suitable as a plasticizer because of its heat stability and relative inertness. These properties may account for the favorable plasticizing results obtained at plasticizer concentrations of as low as 5 or 10%. Other cellulose esters, in addition to cellulose acetate, plasticizable by camphoric anhydride, are, by way of example, lower alkanoates of cellulose, such as cellulose propionate or cellulose butyrate.

Having thus described my invention, I claim:

1. A composition of matter comprising a cellulose lower alkanoate plasticized with camphoric anhydride.

2. A composition of matter comprising a cellulose lower alkanoate plasticized with from about 5 to about 25 parts by weight of camphoric anhydride per 100 parts of cellulose ester.

3. A composition of matter comprising cellulose acetate plasticized with camphoric anhydride.

4. A composition of matter comprising cellulose acetate plasticized with from about 5 to about 25 parts by weight of camphoric anhydride per 100 parts by weight of cellulose acetate.

5. A composition of matter comprising cellulose acetate plasticized with about 5 to about 10 parts by weight of camphoric anhydride per 100 parts of cellulose acetate.

6. A composition of matter comprising cellulose triacetate plasticized with about 5 parts by weight of d-camphoric anhydride per 100 parts by weight of cellulose triacetate.

References Cited in the file of this patent

UNITED STATES PATENTS

| Number | Name | Date |
|---|---|---|
| 2,122,719 | Kriemeier | July 5, 1938 |
| 2,290,522 | Barry et al. | July 21, 1942 |

OTHER REFERENCES

"Uses and Applications of Chemicals and Related Materials," Gregory (vol. 1.) (1939), page 146.